(12) United States Patent
Hamedovic et al.

(10) Patent No.: US 8,068,971 B2
(45) Date of Patent: Nov. 29, 2011

(54) PROCEDURE FOR DETERMINING A FUEL COMPOSITION OR A FUEL QUALITY

(75) Inventors: Haris Hamedovic, Schwieberdingen (DE); Axel Loeffler, Backnang (DE); Wolfgang Fischer, Gerlingen (DE); Roland Karrelmeyer, Bietigheim-Bissingen (DE); Gerald Graf, Gaertringen (DE)

(73) Assignee: Robert Bosch GmbH, Stuttgart (DE)

( * ) Notice: Subject to any disclaimer, the term of this patent is extended or adjusted under 35 U.S.C. 154(b) by 419 days.

(21) Appl. No.: 12/328,507

(22) Filed: Dec. 4, 2008

(65) Prior Publication Data

US 2009/0223485 A1 Sep. 10, 2009

(30) Foreign Application Priority Data

Dec. 14, 2007 (DE) .......................... 10 2007 060 223

(51) Int. Cl.
  *G06F 19/00* (2006.01)
  *F02D 41/04* (2006.01)
  *G01M 15/08* (2006.01)

(52) U.S. Cl. ...................... 701/103; 123/435; 73/114.16

(58) Field of Classification Search ............. 123/406.26, 123/406.3, 406.31, 435, 436, 494, 1 A; 701/101–105, 111, 115; 73/114.16, 114.38, 73/114.55, 114.56; 702/182, 183, 187
See application file for complete search history.

(56) References Cited

U.S. PATENT DOCUMENTS

| 5,050,555 | A | 9/1991 | Mitsumoto |
| 7,367,223 | B2 * | 5/2008 | Kettl et al. ................... 73/53.05 |
| 7,793,536 | B2 * | 9/2010 | Schweinsberg et al. ... 73/114.55 |
| 2008/0308067 | A1 * | 12/2008 | Schuckert et al. ............ 123/435 |
| 2009/0281708 | A1 * | 11/2009 | Loeffler et al. ............... 701/103 |

* cited by examiner

*Primary Examiner* — Willis Wolfe, Jr.
(74) *Attorney, Agent, or Firm* — Merchant & Gould P.C.

(57) ABSTRACT

The invention concerns a procedure for determining the composition of a fuel mixture from a first fuel and a second fuel or for determining the quality of a fuel for operating a combustion engine with at least one cylinder pressure sensor in at least one cylinder of the combustion engine for determining the pressure history during a combustion process and a cylinder pressure based motor regulation for regulating the load and the combustion situation of the combustion engine. It is thereby provided that the determination of the composition of the fuel mixture or the quality of the fuel takes place with the aid of regulator information of the cylinder-pressure-based motor regulation. The procedure enables the continuing determination of the composition of the fuel mixture and the quality of the fuel at cylinder-pressure-based motor regulations without additional components as for example an ethanol sensor.

12 Claims, 1 Drawing Sheet

PROCEDURE FOR DETERMINING A FUEL COMPOSITION OR A FUEL QUALITY

TECHNICAL FIELD

The invention concerns a procedure for determining the composition of a fuel mixture from a first fuel and a second fuel or for determining the quality of a fuel for operating a combustion engine with at least one cylinder pressure sensor in at least one cylinder of the combustion engine for determining the pressure history during a combustion process and a cylinder pressure based motor regulation for regulating the load and the combustion situation of the combustion engine.

BACKGROUND

Combustion engines on the basis of Otto engines are generally operated with fuel consisting of hydrocarbons and fossil fuels on the basis of refined oil. Ethanol that has been increasingly produced from re-growing natural resources (plants) or another alcohol s added to this fuel in different mixing ratios. In the US and in Europe often a mixture of 70-85% ethanol and 15-30% gasoline is used under the trade name E85. The combustion engines are construed in such a way that they can be operated with pure gasoline as well as with mixtures up to E85; this is called 'flex-fuel-operation'. For an economical operation with a low pollutant emission at a simultaneously high engine performance and good starting behavior the operating parameters in the flex-fuel-operation have to be adapted to the present fuel mixture. A stoichiometric air/fuel ratio is for example present at 14.7 weight proportions of air per proportion of gasoline, but an air percentage of 9 weight proportions has to be adjusted when using pure ethanol. Slight and/or slow changes of the alcohol content can be detected and considered by the engine management of the combustion engine with the aid of a lambda probe and/or a knock sensor. But for example after refueling also quick changes with a significant deviation of the composition of the fuel mixture can occur. If the combustion engine was operated with 100% gasoline and refueled with E85 at an almost empty tank, this can cause starting problems and complications with the combustion, which can also increase the exhaust gas emission. According to the state of the art such fast changes of the composition of the fuel can be detected with the aid of an alcohol sensor. But this component increases the costs of the combustion engine.

For operating diesel engines biodiesel-components, known as fame-fuels, are increasingly added to the diesel fuel that is won from raw oil. Furthermore fuels of the $2^{nd}$ generation, produced from the entire biomass (cellulose), are known. These fuels, for example under the trade name Sun-Fuel, are shortly before a series maturity and can also be added to the diesel fuel. Therefore the composition of the ultimately present fuel and related to this the combustion features of the fuel mixture can alternate in wide ranges.

Known are furthermore motor regulations, which take place on the basis of a direct, cylinder individual combustion chamber signals. Preferably cylinder pressure sensors are here used as a sensor, which determined the pressure history during a combustion cycle in temporal high-resolution. Thereby the average induced pressure pmi can be provided for example as a measure for the mechanical work that has been performed by the combustion engine and the status of the combustion focus MFB50 (mass fraction burnt 50%) that has been determined from the pressure history as a reference variable of the regulation. Such cylinder-pressure-based motor regulation concepts regulate the main effects of a change of the composition of the present fuel mixture onto the combustion almost completely away.

A procedure for determining the composition of a fuel mixture from at least a first fuel and a second fuel for operating a combustion engine is known from U.S. patent application Ser. No. 12/126,075, whereby the first and the second fuel provide different rates of combustion and/or different energy contents and whereby the combustion engine provides at least one pressure sensor in at least one combustion chamber, with which a time- and/or angle-synchronic pressure history in the combustion chamber is determined. Thereby it is provided that the composition of the fuel mixture is determined from the time- and/or angle-synchronic pressure history of the gas pressure in the at least one combustion chamber during a combustion phase.

This procedure has the disadvantage that it is a pure detection function, thus that a separate evaluation electronic for determining the composition of the fuel mixture from the data of the pressure sensor besides the pressure sensor has to be provided.

It is the task of the invention to provide a procedure, which allows a reliable and inexpensive detection of the composition of a fuel mixture or the quality of a fuel within an existing regulation concept for combustion engines.

SUMMARY

The task of the invention is solved by undertaking the determination of the composition of the fuel mixture or the quality of the fuel with the aid of regulator information of the cylinder-pressure-based motor regulation. Fuel mixtures of different compositions, for example gasoline/alcohol mixtures or diesel/biodiesel mixtures, or fuels of different qualities, for example regarding the octane rating at gasoline or the cetane rating at diesel fuels, provide different combustion characteristics. Thus different fuel mixtures or fuel qualities distinguish themselves by the combustion speed or the specific energy that has been released during the combustion. Such differences are mostly compensated by a cylinder-pressure-based motor regulation by corresponding corrective controller actions. Determined by the system the cylinder-pressure-based motor regulation is therefore supplied with all the information that enables a determination of the composition of a fuel mixture or the quality of a fuel. Thereby it is advantageous that the determination can take place without additional components, as for example additional sensors. Furthermore it is advantageous that the determination can take place continuously and does not require an external trigger, as for example by detecting a fuel process.

According to an advantageous embodiment of the invention it can be provided that the determination of the composition of the fuel mixture or the quality of the fuel takes place by control variable corrections and/or by control deviations of the cylinder-pressure-based motor regulation. A change of the composition of a fuel mixture or the quality of a fuel, for example by a fuel process, causes a control deviation of at least one parameter that has been regulated by the cylinder-pressure-based motor regulation towards a nominal value that is specified by a motor control unit. The nominal value can thereby be specified for a fuel mixture or a fuel quality or be applicable for the last determined fuel composition or fuel quality depending on the operating status of the combustion engine. The size of the control deviation is therefore a measure for the deviation of the composition of the fuel mixture or the deviation of the quality of the fuel from the standard value, from which the composition of the fuel mixture or the quality of the fuel can be determined correspondingly.

The control deviation is converted by the cylinder-pressure-based motor regulation into a control variable correction, which is additively given to a corresponding control variable default of the motor control unit. Therefore it is corresponding to the control deviation a parameter for determining the composition of the present fuel mixture or the quality of the fuel.

According to further advantageous embodiments of the invention it can be provided that the determination of the composition of the fuel mixture or the quality of the fuel takes place by the control variable correction q_MI of an injection quantity and/or by the control variable correction SOI_MI of a injection timing and/or by the control variable correction of an ignition timing and/or by the control deviation pmi of an average induced pressure during a combustion cycle and/or by the control deviation MFB50 of an average combustion status and/or by the control variable correction and/or the control deviation of a parameter that is deduced from the pre-mentioned parameters.

The mentioned regulator information is correspondingly regulated depending on the composition of the fuel mixture or the quality of the used fuel in current cylinder-pressure-based motor regulation concepts or adjusts itself correspondingly. Thereby the injection quantity correlates with the average induced pressure and thus with the induced work of the combustion engine, while the injection timing at self-igniting combustion engine and the ignition timing at externally-igniting combustion engines correlate with the average combustion status. As the deduced parameter for example the released total energy Q that has been calculated by a heat release rate calculus can be used as reference variable for the load regulation, while the regulation of the combustion status is also possible over the status of a maximum pressure gradient. Accordingly control variable corrections and control deviations can be used in cylinder-pressure-based engine control circuits that are designed for these parameters for determining the fuel composition or for determining the fuel quality.

If it is provided, that the control variable corrections and/or the control deviations are supplied to a classifier, that the composition of the fuel mixture or the quality of the fuel are determined by the classifier as an output variable and that the output variables of the classifiers are supplied to a motor control unit, then the determined composition of the present fuel or the quality of the fuel can be considered by the motor control unit when determining the corresponding nominal values for the cylinder-pressure-based motor regulation, for example for an average induced pressure or an average combustion status, and when determining the corresponding control variable defaults for the combustion engine, for example the injection quantity or the injection timing or the ignition timing. By adjusting the nominal values and/or the control variable defaults the control circuit of the cylinder-pressure-based motor regulation can always be advantageously operated in an average control range. The use of a classifier has the advantage that it can be used for different applications, for example at diesel-engines as well as at Otto-engines operated in flex-fuel-operation, whereby the classifier only has to be programmed to the corresponding input variables as well as a corresponding calibration or application of the classifier has to be undertaken. Classifier, motor control unit and cylinder-pressure-based motor regulation can be integrated into a corresponding motor electronic as hard- and/or software-solution.

An applicable analysis of the input data of the classifier can take place when the classifier determines the composition of the fuel mixture or the quality of the fuel from an engine map or from a data-based calculation model. Thereby a corresponding engine map is easy to create, for example empirically by a corresponding test operation, while a data-based calculation model enables a higher accuracy when determining the fuel composition or the fuel quality.

In order to improve the accuracy as well as to reduce the influence of disturbance variables, as for example a not corrected drift of an air mass sensor, it can be provided, that the classifier is supplied with further cylinder-pressure-based parameters, especially the maximum pressure gradient and/or the status of the maximum pressure gradient and/or the combustion duration and/or the maximum pressure and/or the status of the maximum pressure and/or the released total energy and/or the maximum released differential energy amount and/or a measure for combustion stability. These further cylinder-pressure-based parameters can be then considered when determining the fuel composition or the fuel quality within the engine map or the data-based calculating model of the classifier. The measure for the combustion stability can thereby be determined on the basis of the standard deviation of one or more of the mentioned parameters relatively to the average value. The status of the different parameters can be described for example over a corresponding crankshaft angle.

Besides the composition of the present fuel mixture or the quality of the fuel also deviating environmental conditions have an influence on the power-operated combustion, which is also balanced by the cylinder-pressure-based motor regulation and therefore finds its way into the corresponding control variables. A further improvement of the accuracy can therefore be achieved by supplying the classifier with parameters about the atmosphere pressure and the atmosphere temperature, which are then considered at the determination of the composition of a fuel mixture or the quality of a fuel.

A further positive influence onto the accuracy of the determination of the fuel composition or the fuel quality can be achieved by activating the classifier at stationary operating conditions of the combustion engine and/or in idle mode of the combustion engine and/or above a default operating temperature of the combustion engine and/or in the presence of a specified atmosphere pressure range and/or in the presence of a specified atmosphere temperature range. Thus the controlling of the operating temperature of the combustion engine for example allows that the determination of the composition of the fuel mixture or the quality of the fuel does not take place at a cold start or during the following warming phase of the combustion engine, since the basic application of the motor control unit is changed during these phases. The operating temperature of the combustion engine can simply take place by checking the motor- or coolant temperature.

Because the start and warm up behavior is drastically changed in particular by adding bio-ethanol to gasoline at Otto-engines that are operated in flex-fuel-operation, it can be advantageous to carry out a rough determination of the composition of the fuel mixture and/or the quality of the fuel during a start phase and/or a warm up phase of the combustion engine and to carry out an accurate determination of the composition of the fuel mixture and/or the quality of the fuel in at least one of the following operating phases of the combustion engine. The control and the regulation of the combustion engine can already be set roughly set to a new composition of a fuel mixture or fuel quality during the start and warm up phase, which enables an undisturbed operation during these phases.

According to a preferred embodiment of the invention it can be provided that the function of the cylinder-pressure-based motor regulation and/or the classifier are implemented in the form of a program code in a superior motor control unit or in a separate hardware. The implementation in a superior motor control unit offers in particular the advantage that no additional components are required and that the implementation of the procedure can be carried out cheap by a simple software enhancement in an established electronic.

The procedure can be preferably applied for determining the composition of a gasoline/alcohol fuel mixture and/or for determining the composition of a diesel/biodiesel fuel mixture and/or for determining the octane rating of a fuel and/or for determining the cetane rating of a diesel fuel.

The procedure is also preferably applicable for determining the composition of a fuel mixture and/or the quality of a fuel for operating an externally ignited and/or a self-ignited combustion engine.

BRIEF DESCRIPTION OF THE DRAWINGS

The invention is further explained in the following by an embodiment that is shown in FIG. 1. It shows.

DETAILED DESCRIPTION

Figure 1:
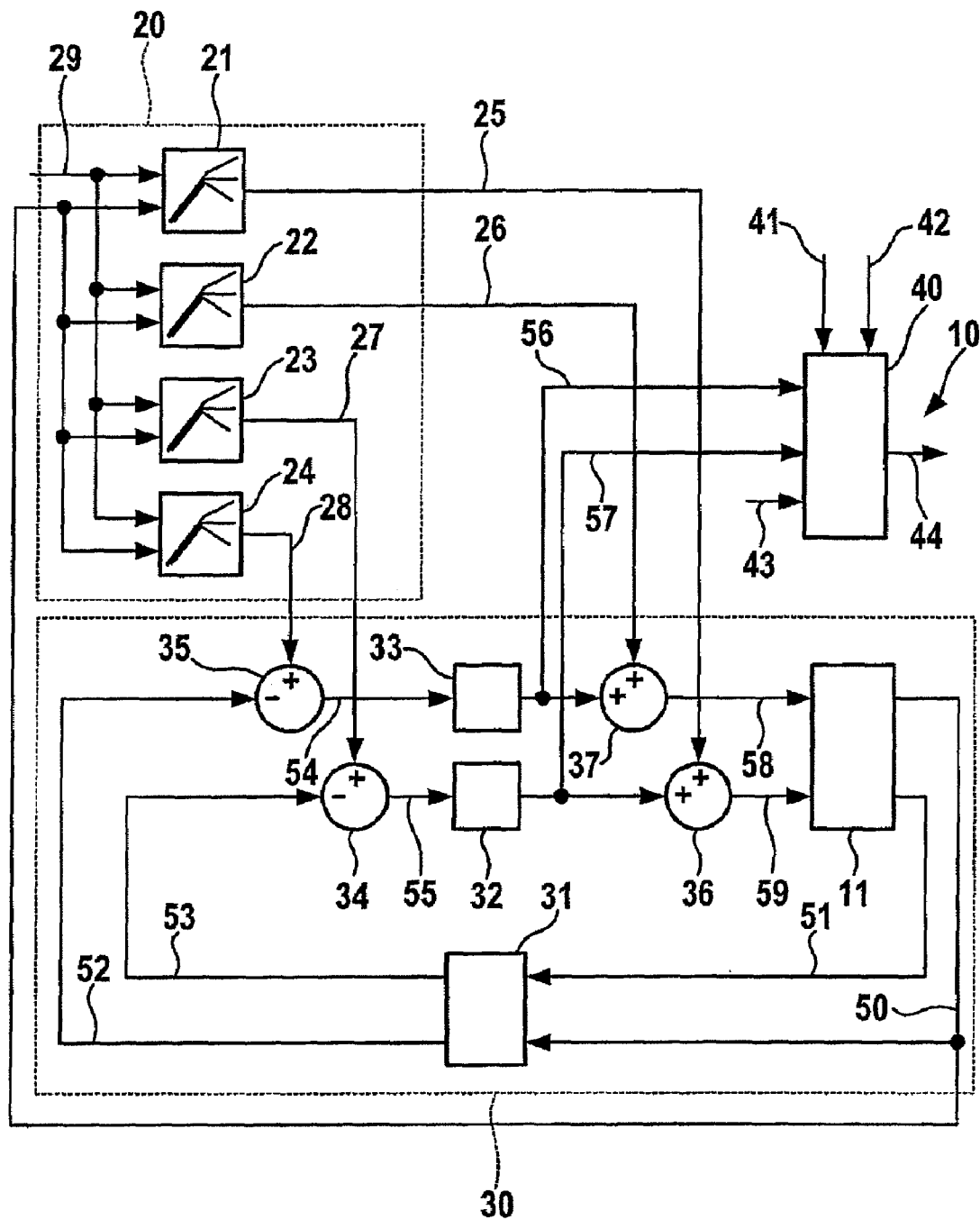
FIG. 1 shows schematically a motor electronic with a cylinder-pressure-based motor regulation and a classifier for determining the composition of a fuel mixture.

FIG. 1 schematically shows a motor electronic 10 with a cylinder-pressure-based motor regulation 30 and a classifier 40 for determining the composition of a fuel mixture for a combustion engine 11, which can be operated with diesel, biodiesel or with a mixture of diesel and biodiesel. Thereby only components of the motor electronic 10 are shown, which are necessary for the description of the invention.

For a better understanding the motor electronic 10 is divided into the familiar areas cylinder-pressure-based motor regulation 30, motor control unit 20 as well as the classifier 40. But the cylinder-pressure-based motor regulation 30, motor control unit 20 as well as the classifier 40 can be integrated in a component as hard- or software solution.

The motor control unit 20 contains a control engine map Q_MI 21, a control engine map SOI_MI 22, a nominal value engine map p_MI 23 as a nominal value engine map MFB50 24. These engine maps are provided with a load signal 29, which describes the load of the combustion engine 11, and the engine speed 50 of the combustion engine 11 as input variables.

The control engine map q_MI 21 determines a control variable default q_MI 25 from the input variables load signal 29 and engine speed 50, which determines a not yet corrected injection quantity for the combustion engine 11 as a control variable.

The control engine map SOI_MI 22 determines a control variable default SOI_MI 26 from the input parameters, which also represents a not yet corrected default for the starting of the injection (SOI) for the combustion engine 11.

The nominal value engine map p_MI 23 specifies a nominal value p_MI 27 from the input parameters as a nominal value for an average induced pressure p_MI in the control circuit of the cylinder-pressure-based motor regulation 30.

The nominal value engine map MFB50 determines a nominal value MFB50_soll 28 from the output variables also as a nominal value default for the cylinder-pressure-based motor regulation 30. MFB50 means thereby mass fraction burnt 50%, thus the status of the combustion focus.

The control circuit of the cylinder-pressure-based motor regulation 30 is assigned to the combustion engine 11 in the selected illustration. Thereby the block combustion engine 11 contains all not illustrated components that are required for operating the combustion engine 11, in particular a fuel metering system, an engine speed sensor and at least a cylinder pressure sensor for determining the pressure curse in a cylinder during the combustion processes.

The combustion engine 11 is supplied with a control variable SOI_MI 58 as the input parameters for determining the start of the injection and therefore the status of the combustion focus as well as a control variable q_MI 59 for determining the injection quantity.

Depending on the input parameters control variable SOI_MI 58 and control variable q_MI 59 a course of the cylinder pressure occurs, which is released as cylinder pressure signal 51, and an engine speed 50 of the combustion engine 11, which also illustrates an output signal of the combustion engine 11. The cylinder pressure signal 51 and the engine speed 50 are supplied to a calculating unit 31. The engine speed signal 50 furthermore serves as input parameter for the motor control unit 20 as already described.

The calculating unit 31 determines an actual value MFB50_ist 52 and an actual value pmi_ist 53 from the engine speed 50 and the cylinder pressure signal 51. The actual value MFB50_ist 52 thereby illustrates the actual status of the combustion focus, while the actual value pmi_ist 53 illustrates the actual average induced pressure.

The actual value MFB50_ist 52 is provided to a comparing unit MFB50 35 and there compared with the output signal of the nominal value MFB50_soll 28. The comparing unit MFB50 35 creates a control deviation MFB50 54 as an input parameter for a MFB50-regulator 33 from the difference of the nominal value MFB50_soll 28 and the actual value MFB50_ist 52.

Accordingly the actual value pmi_ist 53 is provided to a comparing unit pmi 34 and there compared with the output signal of the nominal value p_MI 23, thus the nominal value pmi_soll 26. The comparing unit pmi 34 also creates here a control deviation pmi 55 as an input parameter for a pmi-regulator 32 by a subtraction.

The MFB50-regulator 33 determines a control variable correction SOI_MI 56 from the control deviation MFB50 54, which is added in a subsequent addition unit SOI_MI 37 to the control variable default SOI_MI 26. The thereby created output signal of the addition unit SOI_MI 37, the control variable SOI_MI 58 is delivered to the combustion engine 11 as a measure for the beginning of the injection as it has been already described.

The pmi-regulator 32 creates a control variable correction q_MI 57 from the control deviation pmi 55, which is added in a subsequent addition unit q MI 36 to the control variable default q_MI 25. As a result of this addition the control variable q_MI 59 is passed on to the combustion engine 11 as a measure for the injection quantity that has to be injected to the combustion engine 11.

The control variable correction SOI_MI 56 and the control variable correction q_MI 57 are supplied to the classifier 40 according to this invention. Besides these both input parameters the classifier 40 is also supplied with a signal idle 41, a signal engine temperature 42 as well as a signal environmental conditions 43. The classifier 40 delivers an output signal admixture rate 44, which describes the composition of the fuel mixture of diesel and biodiesel.

The course of the determination of the composition of the fuel mixture takes place in the following way:

Based on an established composition of the present fuel mixture the control engine map q_MI 21 and the control engine map SOI_MI release the control variable default q_MI 25 and the control variable default SOI_MI 26 depending on the load signal 29 and the engine speed 50. According to the control variable default q_MI 25 the injection quantity of the combustion engine 11 and according to the control variable default SOI_MI 26 the status of the combustion focus are specified. The pressure course in at least one cylinder of the combustion engi8ne 11 is determined with the aid of a cylinder pressure sensor during the combustion, furthermore the engine speed 50 of the combustion engine 11 is determined with an engine speed sensor. The average pressure actual value pmi ist 53 that is actually present during the combustion as well as the actually present status of the combustion focus actual value MFB50_ist 52 are determined from the pressure course and the engine speed with the aid of the calculation unit 31. These values are compared with the corresponding nominal value defaults nominal value pmi_soll 27 and nominal value MFB50_soll 28, which are specified by the motor control unit 20 for the present load and engine speed 50 of the combustion engine 11. The pmi-regulator 32 and the MFB50-regulator determined corresponding control variable correction values in the form of control variable correction SOI_MI 56 and control variable correction q_MI 57 from the thereby resulting control deviations, the control deviation MFB50 54 and the control deviation pmi 55. The control variable defaults control variable default SOI_MI 26 and control variable correction q_MI 25 that are specified by the motor control unit 20 are corrected with the control variable corrections 56, 57 that have been determined by the cylinder-pressure-based motor regulation 30 and thus the injection quantity and the status of the combustion focus are adjusted.

When changing the composition of the fuel mixture, for example by a fuel process, the average induced pressure as well as the status of the combustion focus change due to the changed fuel characteristics at the same control variable defaults 25, 26. That is regulated away by the described control circuit of the cylinder-pressure-based motor regulation 30. Therefore a modified control deviation MFB50 54 and a modified control deviation pmi 55 adjust. The initial changes of the control deviations 54, 55 are therefore a measure for the modified fuel composition and can be used in a not shown embodiment of the invention for determining the fuel composition.

The modified control deviations 54, 55 cause a modified control variable correction SOI_MI 56 and a modified control variable correction q_MI 57. The classifier 40 can determine the composition of the new fuel mixture from these modified control variable corrections 56, 57 and release the in the form of output signal admixture rate 44.

The composition of the new fuel mixture can for example be provided to the motor control unit 20 and be considered by it when determining the control variable defaults 25, 26 and the nominal values 27, 28.

The composition of the fuel mixture can be best determined in stabile, stationary operating points of the combustion engine 11. Operating points shall be thereby provided, which occur often, as for example the idle mode of the combustion engine 11. According to the illustrated embodiment the classifier 40 is supplied with a signal idle 41, which signalized the classifier 40 the operating point idle mode of the combustion engine 11 and thus starts the determination of the composition of the fuel mixture.

The composition of the fuel mixture shall preferably not take place in cold start or in the subsequent warm up phase, because the basic application of the motor control unit 20 is changed hereby. The classifier 40 has therefore be supplied with a signal engine temperature 42, which causes that the determination of the composition of the fuel mixture only takes place at a sufficiently high engine or coolant temperature. But the cylinder-pressure-based motor regulation 30 with the corresponding load- and combustion status regulation is then still active with the modified nominal values 27, 28 and control variable defaults 25, 26 during the cold start or the warm up phase and can regulate the main effects of a modified fuel composition on the combustion away in the operating phase.

Modified environmental conditions for example a changed atmosphere pressure or a changed outside temperature also have an influence on the combustion, which is then balanced by the cylinder-pressure-based motor regulation 30 and which is correspondingly reflected in the control information such as control variable corrections 56, 57 and control deviations 54, 55. Particularly it may well be at slight changes of the composition of the fuel mixture that the effects on the combustion by the changed fuel composition are dominated by effects of changed environmental conditions, which can cause accuracy losses at the determination of the fuel composition up to false determinations. The classifier 40 is therefore provided with a signal environmental conditions 43. This signal environmental conditions 43 allows the classifier 40 to consider changed environmental conditions when determining the composition of the fuel mixture.

Furthermore it can be provided based on the signal environmental conditions 43, that the determination of the composition of the fuel mixture only takes place within specified temperature or air pressure areas, which allow an accurate determination of the composition of the fuel mixture.

The illustrated embodiment is provided for determining the composition of a diesel/biodiesel fuel mixture, but can also be used for detecting the composition of a gasoline/alcohol fuel mixture of an Otto-engine with direct injection that is operated in self-ignition.

The procedure can also be used for detecting the composition of a gasoline/alcohol fuel mixture of an externally igniting combustion engine. The main difference is then the input parameters and the calibrating of the classifier 40. The status of the combustion focus at externally ignited combustion engines 11 is not regulated over the beginning of the injection, but over the ignition timing.

The procedure can also be used for determining the quality of a fuel, for example the octane rating at gasoline or the cetane rating at diesel fuel. A changed fuel quality causes changed combustion characteristics, which are balanced by the cylinder-pressure-based motor regulation 30. The corresponding changes of the control deviations 54, 55 or the deduced control variable corrections 56, 57 can be provided to the classifier 40 and a statement about the fuel quality can be made at an applicable calibration of the classifier 40.

The classifier 40 can be provided in the easiest variation as engine map. But a higher accuracy can be achieved when the determination of the composition of the fuel mixture or the quality of the fuel takes place on the basis of a superior data-based calculating model.

In order to reduce the storage complexity it is possible to implement the determination of the composition of the fuel mixture or the quality of a fuel only on the basis of a parameter, for example the control variable correction q_MI 57 or control variable correction SOI_MI. But this takes place at the expense of a reduced accuracy.

But the accuracy can be improved when further characteristics are considered by the classifier 40 at the determination of the fuel composition or the fuel quality. Thus the pressure gradient dp_max that is also present in a cylinder-pressure-based motor regulation 30 can be included as a measure for the combustion noise, the combustion duration BD, for example defined over the difference MFB59-MFB10, as a secondary measure for the fuel composition as for example a aroma content and the top pressure p_max as a measure for the actual compression proportion. Furthermore also the released total energy and/or the maximum released differential energy amount and/or a measure for the combustion stability can be provided. Thereby the standard deviation of one or more of the mentioned parameters relatively to the average value can be used as a measure for the combustion quality. It is furthermore possible to provide the status of the mentioned parameters, for example stated by a corresponding crankshaft angle, to the classifier 40 and to consider them at the determination of the composition of the fuel mixture or the fuel quality.

It is furthermore possible that the control variable correction 56, 57 or the control deviation 54, 55 are determined as input parameters for the classifier 40 over several combustion cycles and that the determination of the fuel composition or fuel quality takes place from these determined values.

Furthermore the load and the combustion status of the combustion engine e11 can also be regulated on the basis of other characteristics or other control variable interventions can be provided according to the principle of the cylinder-pressure-based motor regulation 30. A load regulation is for example also possible on the basis of the reference variable released energy amount Q and a regulation of the combustion status on the basis of the reference parameter status of the maximum pressure gradient αdp_max. That does not change anything about the principle pf the procedure for determining the composition of the fuel mixture or the quality of the fuel, it only requires another application of the model that is in the classifier 40.

A cylinder-pressure-based motor regulation 30 is necessary for the implementation of the procedure, which is based on the pressure signal of at least one cylinder pressure sensor in a cylinder of the combustion engine 11. If corresponding cylinder pressure sensors are provided for several cylinders, the sturdiness of the procedure for detecting the fuel composition or the fuel quality can be increased. Therefore a two-out-of-three set-up concept can for example be provided.

To implement the procedure no explicit test area, for example in a dragged engine operation, is necessary, which is potentially noticeable for the driver. The determination can be implemented continuously and it does not require an external trigger, for example triggering by changing the fuel display. When determining the fuel composition admixture rates of 0% to 100% can be noticed, whereby the achievable accuracy depends among others on the accuracy of the used cylinder pressure sensor.

The invention claimed is:

1. A method of determining the composition of a fuel mixture from a first fuel and a second fuel and the quality of a fuel for operating a combustion engine, wherein at least one cylinder pressure sensor in at least one cylinder of the combustion engine is provided for determining a pressure history during a combustion process, and wherein a cylinder pressure based motor regulation is provided for regulating a load and a combustion situation of the combustion engine, the method comprising:
   determining a plurality of control variable corrections of the cylinder-pressure-based motor regulation;
   determining the composition of the fuel mixture and the quality of the fuel as one or more output variables in a classifier using the control variable corrections; and
   sending the one or more output variables to an engine control.

2. The method according to claim 1, further comprising determining the composition of the fuel mixture and the quality of the fuel at the classifier from one of: an engine map; and a data-based calculation model.

3. The method according to claim 1, further comprising supplying the classifier with one or more cylinder-pressure-based parameters chosen from a list including: a maximum pressure gradient; a status of the maximum pressure gradient; a combustion duration; a maximum pressure; a released total energy; a maximum released differential energy amount; a status of the maximum released differential energy amount; and a measure for the combustion stability.

4. The method according to claim 1, further comprising supplying the classifier with one or more parameters for an atmosphere pressure and an outside temperature.

5. The method according to claim 1, further comprising activating the classifier at one of: a stationary operating condition of the combustion engine; an idle mode of the combustion engine; above a default operating temperature of the combustion engine; in the presence of a predetermined atmosphere pressure; and in the presence of a predetermined outside temperature range.

6. The method according to claim 1, further comprising making a rough determination of the composition of the fuel mixture and the quality of the fuel during a starting phase and/or a warm up phase of the combustion engine, wherein at at least one following operating phase of the combustion engine a precise determination of the composition of the fuel mixture and the quality of the fuel occurs.

7. The method according to claim 1, further comprising implementing a plurality of functions of the cylinder-pressure-based motor regulation and the classifier as a program code stored in one of: a superior engine control; and a separate hardware component.

8. The method according to claim 1, further comprising determining at least one of a composition of a gasoline/alcohol fuel mixture; a composition of a diesel/biodiesel fuel composition; an octane rating of a fuel; and a cetane rating of a diesel fuel.

9. The method according to claim 8, further comprising determining at least one of: a composition of the fuel mixture; the quality of the fuel for operating an externally-igniting combustion engine; and the quality of the fuel for operating an a self-igniting combustion engine.

10. A method according to claim 1, further comprising determining the composition of the fuel mixture and the quality of the fuel by a plurality of control deviations.

11. The method according to claim 10, further comprising determining the composition of the fuel mixture and the quality of the fuel by at least one of: a control variable correction of an injection quantity; a control variable correction of an injection point of time; a control variable correction of an ignition timing; a control deviation of an average induced pressure during a combustion cycle; a control deviation of an average combustion situation; a control variable correction; and a control deviation of a parameter deduced from at least one of the pre-mentioned factors.

12. A method according to claim 11, further comprising sending the control variable correction of the injection quantity; the control variable correction of the injection point of time; the control variable correction of the ignition timing; the control deviation of the average induced pressure during a combustion cycle; and the control deviation of the average combustion situation to the classifier.

* * * * *